(12) United States Patent
Stone (10) Patent No.: US 9,594,214 B1
(45) Date of Patent: Mar. 14, 2017

(54) OPTICAL FIBER DEVICES (71) Applicant: Thomas W. Stone, Hellertown, PA (US)

(72) Inventor: Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 0 days.

(21) Appl. No.: 14/216,512

(22) Filed: Mar. 17, 2014

Related U.S. Application Data (60) Provisional application No. 61/798,124, filed on Mar. 15, 2013.

(51) Int. Cl.
*G02B 6/26* (2006.01)

(52) U.S. Cl.
CPC .................... *G02B 6/264* (2013.01)

(58) Field of Classification Search
CPC ...................................................... G02B 6/264
See application file for complete search history.

(56) References Cited

U.S. PATENT DOCUMENTS

| | | | | |
|---|---|---|---|---|
| 4,119,362 A | * | 10/1978 | Holzman | G02B 6/32 385/73 |
| 4,185,885 A | * | 1/1980 | Chown et al. | 385/73 |
| 4,420,219 A | * | 12/1983 | Muchel | G02B 6/2817 385/25 |
| 6,847,765 B2 | * | 1/2005 | Nishimura | 385/50 |
| 2004/0252941 A1 | * | 12/2004 | Hsia et al. | 385/34 |

* cited by examiner

*Primary Examiner* — Sung Pak
(74) *Attorney, Agent, or Firm* — Burns & Levinson LLP; Orlando Lopez (57) ABSTRACT

Fiber optic connectors and splices that are contamination tolerant and can be used in cramped and constrained environments.

21 Claims, 8 Drawing Sheets

OPTICAL FIBER DEVICES

CROSS-REFERENCE TO RELATED APPLICATIONS

This application claims the benefit of priority to U.S. Provisional Application No. 61/798,124, filed on Mar. 15, 2013, which is incorporated herein by reference in its entirety for all purposes.

BACKGROUND

The present disclosure relates generally fiber optic connectors.

There is a need for fiber optic connectors and splices that are contamination tolerant and can be used in cramped and constrained environments.

SUMMARY

The various embodiments of the present teachings disclose fiber optic connectors and splices that are contamination tolerant and can be used in cramped and constrained environments.

For a better understanding of the present teachings, together with other and further objects thereof, reference is made to the accompanying drawings and detailed description.

DETAILED DESCRIPTION

Figure 1:
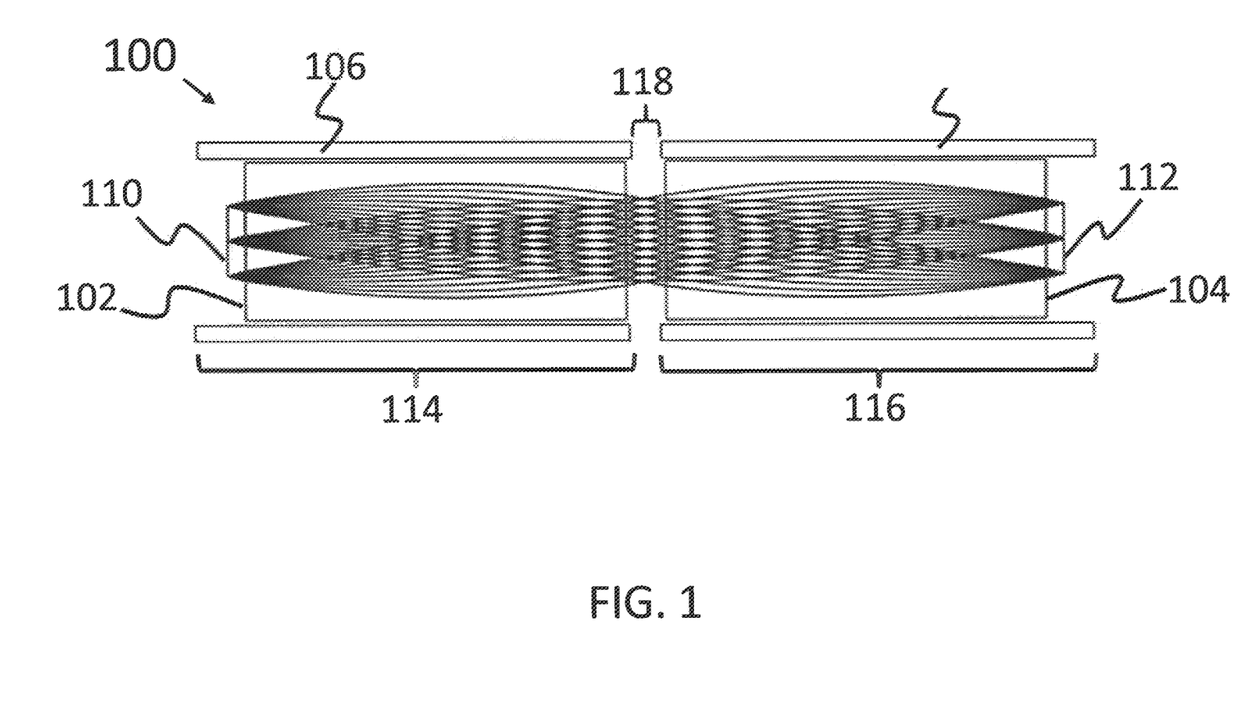
FIG. 1 illustrates an imaging relay lens.

Reference is made to system 100 FIG. 1, which illustrates an imaging relay lens including a pair of lenses 102 and 104 used to reimage an object array 110 to an image array 112 as described in U.S. Pat. Nos. 6,635,861, 7,015,454, 7,446,298, and 8,171,625 which are incorporated herein by reference in their entirety and for all purposes Hereinafter the term "lens" is used interchangeably with "imager" or "imaging optics". Also shown in system 100 are optional housings including housing 106 for imager 102 and housing 108 for imager 104. System 100 is also shown with optional gap 118 between imager and array assembly 114 and imager and array assembly 116.

Figure 2:
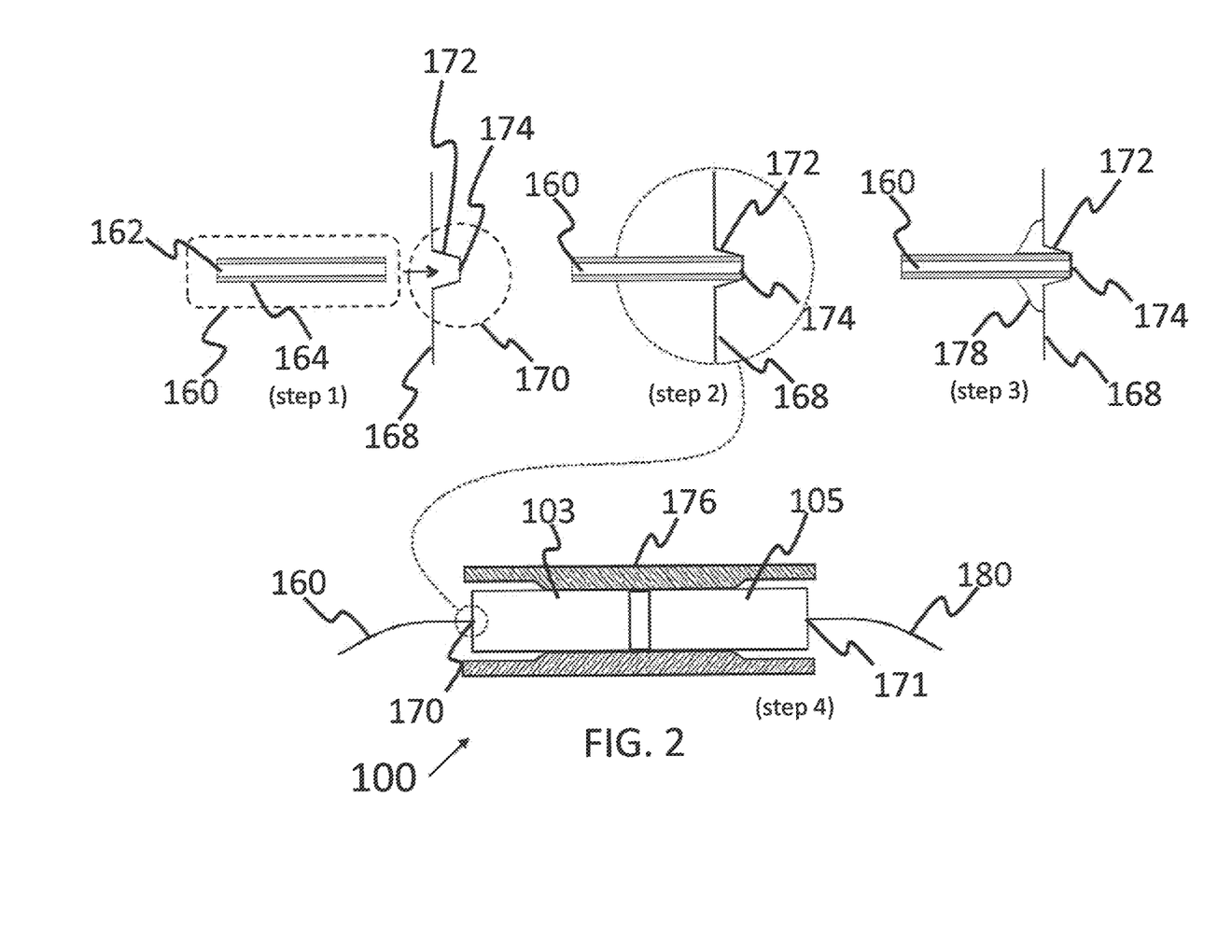
FIG. 2 shows an embodiment of the system of these teachings.

In the embodiment 130 shown in FIG. 2, divots 170 and 171 (also referred to as indentations) matching the footprint of bare fibers 160 and 180, (or alternatively a cladded fiber, jacketed fiber, or cabled fiber) are prealigned and etched with high precision into the imagers 103 and 105 which, without limitation, is shown in FIG. 2 as infinite conjugate (such as quarter pitch) rod lenses. Other imagers can be used of any type including without limitation refractive, reflective, diffractive, gradient index, or any combinations thereof such that the divot 170 on one side (or end) is imaged onto the corresponding divot 171 on the other side (or end). An element including but not limited to windows, spacers, coatings, lenses, etc. can be incorporated in the proximity of the image plane to contain the divot or divots. The term "divot" is also referred to, without limitation, as "indention", "depression", "hole", "pit", "fiduciary", "channel", "alignment channel", alignment seat, etc.

Referring again to embodiment 130 in FIG. 2, the bare optical fiber 160 typically includes an optical fiber waveguide 162 and optional coating 164. The first divot 170 is shown in expanded detail in FIG. 2. The divot 170 is located in the proximity of the image plane on the rod lens which in this case is in the proximity of the front rod face 168. The divot includes of sidewall 172 and divot face 174. The optical fiber 160 is inserted into the divot and is fixed in the divot with adhesive 178. The term "adhesive" is also referred to herein and includes without limitation "sealants", "cements", "optical cements", "high temperature sealants", "gels", etc.

Embodiments with multiple divots on each end are described below. All these embodiments allows for rapid, tight tolerance alignment of the fibers to the imagers to be readily obtained in manufacture or in the field by untrained personnel. The embodiment shown in FIG. 2 can be used to improve connectors as described in the art included by reference above, or also can be used as a pre-aligned infinite conjugate fiber optic splice device. The terms splice and interconnect are used interchangeably in this application. In the splice embodiments, the two infinite conjugate imagers can be pre-aligned in a sleeve or housing as shown in FIG. 2. The divots are therefore imaged from one side to the other onto each other, and fibers can be spliced by simply fixing them, such as with the use of an optical cement or adhesive, into corresponding divots. The term corresponding divots used here refers hereinafter to divots that are substantially imaged onto each other. The embodiment of FIG. 2 shows a single divot on the optical axis at each end. Here the divots 170 and 171 at each end are corresponding divots meaning they are imaged onto each other by the imagers. While infinite conjugate imagers are shown in the embodiment of FIG. 2, finite conjugate imagers can also be used, as represented in the context of FIG. 2 by simply joining the two rod lenses into a single rod lens of twice the length (cementing them together or initially fabricating the rod lens at twice the infinite conjugate length). In the resulting finite conjugate embodiments the divots can be placed in the proximity of the imager ends during manufacture as before. Irrespective of the specific type of imagers used, such as but not limited to finite conjugate imagers, pairs of infinite conjugate imagers, etc., the divots are located in the proximity of conjugate image planes that are imaged onto each other by the imagers; and corresponding pairs of divots, one divot from each pair of divots on each conjugate plane, are substantially imaged onto each other.

Another feature of the embodiment 130 of FIG. 2 is that a pair of infinite conjugate gradient index rod lenses is used which greatly relax alignment tolerances in several ways. First, since the alignment divots or channels 170 and 171 are in the proximity of an image plane, there is a reduced sensitivity to variations in the angular orientation of the fiber in the alignment channel—these do not alter the image location of the spot imaged on the mating fiber. Similarly, since the light from the input fiber is collimated in the region between the rod lenses, there is a large degree of tolerance for lateral and longitudinal misalignments (e.g., often a millimeter or so) between the mating infinite conjugate rod lenses.

In the embodiment 130 of FIG. 2 a high temperature sealant or cement is shown as an example not meant as a limitation, and although other sealants or cements or adhesives can be used. Optical cements or adhesives or sealants or gels, etc., can be used and can reduce reflections from the fiber-imager interface as well as reduce the effects of surface roughness. They can also keep particulates out of the region near the fiber core at the fiber-imager interface.

In embodiment 130 in FIG. 2, an optical fiber 160 is inserted in a pre-aligned and pre-etched alignment channel 170 on the face of a quarter-pitch infinite conjugate rod lens 103. Once in the channel the fiber is sealed/fixed in place. The same is done with the other corresponding or mating fiber 180 and a second symmetric infinite conjugate rod lens 105. The two lenses are then slid into an alignment sleeve 176 completing the low insertion loss, contamination tolerant splice. Other embodiments of the present teachings are given in FIGS. 3-8, and include multiple fiber connectors and optical fiber taps. This splice is relatively tolerant to lateral and longitudinal displacements between the rod lenses, and to the angular tilts between the fiber and the rod lens. For the cases described above were the two rod lenses are combined or an alternate finite conjugate imager replaces the pair of infinite conjugate imagers, the alignment sleeve 176 may not be required.

The embodiment 130 can provide a splice between fibers 160 and 180 that are rugged, alignment tolerant, contamination tolerant, and with high temperature material selections are suitable for the vibration and temperature ranges of commercial and military aerospace avionic and control applications. When pairs of infinite conjugate imagers are used is in embodiment 130, the splice operation can be implemented in a removable scenario where the fibers and imagers can be removed from the sleeve and reinserted or replace with other fibers and imagers. The contamination tolerance is a big factor for avionic applications, and follows from the choice of the rod lens to be one to several millimeters in diameter. Oil films, for example, will separate into a mostly-open web formation on the rod lens surface. Since the light from the fiber is a large plane wave in the gap region, very little light is scattered from the oil or other contamination. Indeed, partially or completely filling the gap region with oil is also robustly tolerated. The same tolerance is observed for relatively heavy particulate contamination on the lens surfaces. This technology is inexpensive and is readily applied in the field or "on-aircraft" under cramped and constrained environments. The contamination insensitivity of this technology has been established in oily environments including the spray of PAO oil (Inland 45). This splice technology also has the ability to be used to provide signal taps from fibers when required. In addition, multiple fibers can be spliced using a single splice. This novel technology is applicable to both single-mode and multi-mode optical fibers. Insertion losses for the PREALIGNED INFINITE CONJUGATE FIBER OPTIC SPLICE splices are low.

In the embodiment of FIG. 2 (or embodiments of FIGS. 3-8), a divot or channel matching the footprint of a bare fiber, cladded fiber, jacketed fiber, or cabled fiber is pre-aligned and created, using techniques including but not limited to etching, grinding, drilling, abrading, milling, molding, embossing, with high precision in the manufacturing stage. This allows for a rapid, tight tolerance alignment to be readily obtained in the field by untrained personnel. Further no arc discharge is needed so the splice or connection can be made in an explosive or flammable environment. Since the alignment divot or channel is in an image plane, relatively large variations in the angular orientation of the fiber in the alignment channel do not alter the image location of the spot imaged on the mating fiber—there is a pronounced insensitivity to angular fiber orientational errors, so long as the fiber is in the channel.

Figure 3:
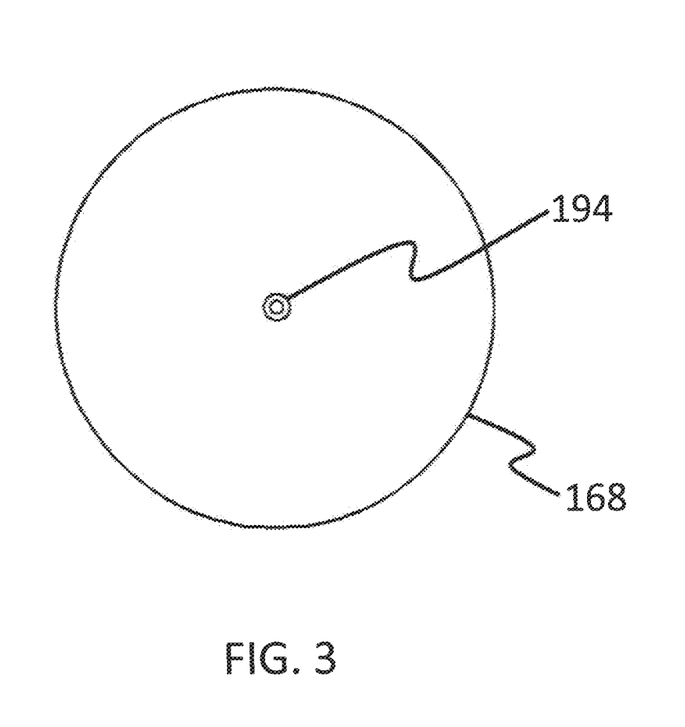
FIG. 3 shows a view of a portion of one embodiment of the system of these teachings.

The alignment channel or divot 194 located in the rod lens face 168 can be fabricated using for example, without limitation, conventional optical fabrication techniques, lithographic techniques (reactive ion etching, etc.), and nanofabrication techniques or their combinations, or as described above. The alignment channel or divot (these terms are used here interchangeabley) is precision aligned in manufacture and can be etched into the rod lens face using ion-etching or similar nano-fabrication techniques or other process examples of which are given above without limitation.

Figure 4:
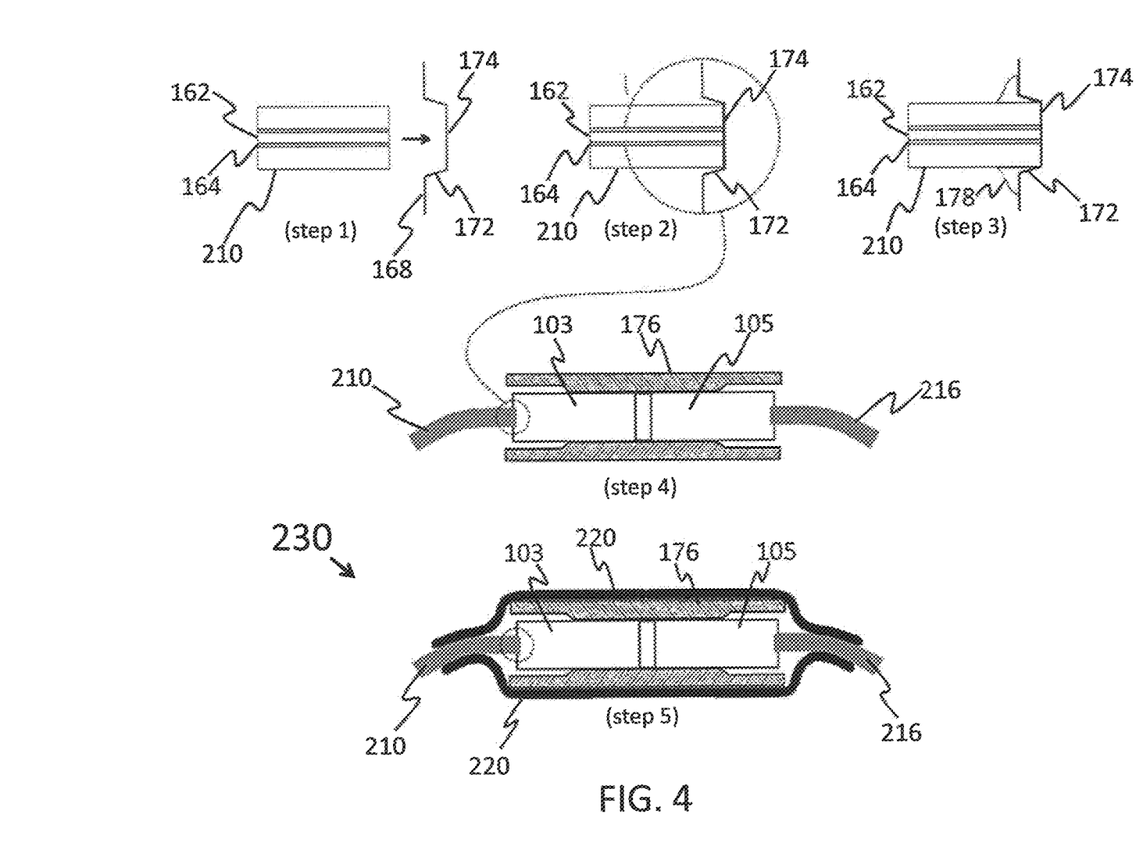
FIG. 4 shows one embodiment of the method for fabricating embodiments of the system of these teachings.
Figure 5:
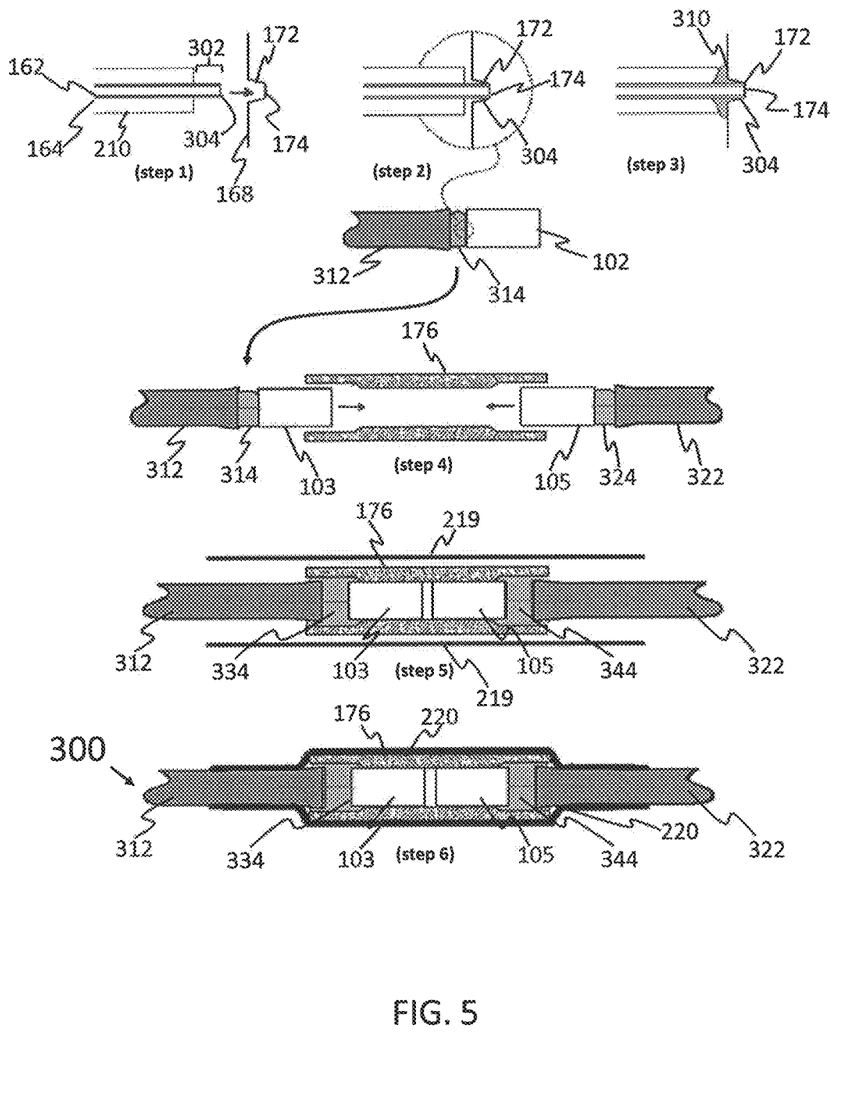
FIG. 5 shows another embodiment of the method for fabricating embodiments of the system of these teachings.

FIG. 4 shows the assembly of another embodiment 230 of the present teachings comprising a coated or cladded fiber or fiber cable or fiber bundle. Optical fiber waveguide 162 is surrounded by coating 164 and additional jacket 210 which can include, without limitation, cabling, cladding, wrapping, strain relief, etc. As before the high temperature sealant 178 is shown to represent other adhesives, sealants, cements, etc. without limitation. Once the coated or cladded or cabled fibers 210 and 216 are aligned to the imagers 103 and 105 by the divot and attached, the two imagers can be connected using the sleeve or connector 176 as shown. conventional strain relief materials such as heat shrink tubing 220 or rubber boots can be applied as shown.

In another embodiment larger jacketed cables around multimode fibers or fiber arrays are inserted in the alignment channels, fixed in an alignment sleeve, and strain-relieved. A Referring embodiment 300 of FIG. 5, jacketed optical fiber 210 can be stripped or partially stripped of outer layers in a region 302 near the end of the optical fiber. The stripped optical fiber 304 is then inserted in the divot as described for earlier embodiments and sealed using adhesive or optical cement 310. The jacketed fiber optic cable 210 can be surrounded by additional strain relief or protection wrappings 312. Additional strain relief or potting material 314, which also can be adhesives or cements, can be used to further secure the optical fiber to the imager. The other fiber 322 to be connected using this splice can be further attached to imager 105 using additional strain relief or potting material 324. When imagers 103 and 105 are inserted into alignment sleeve 176 a strain relief material 219 such as but not limited to heat shrink tubing can be applied. In embodiment 300 strain relief material 220 is shown after application and processing, such as heating heat shrink tubing.

Figure 6:
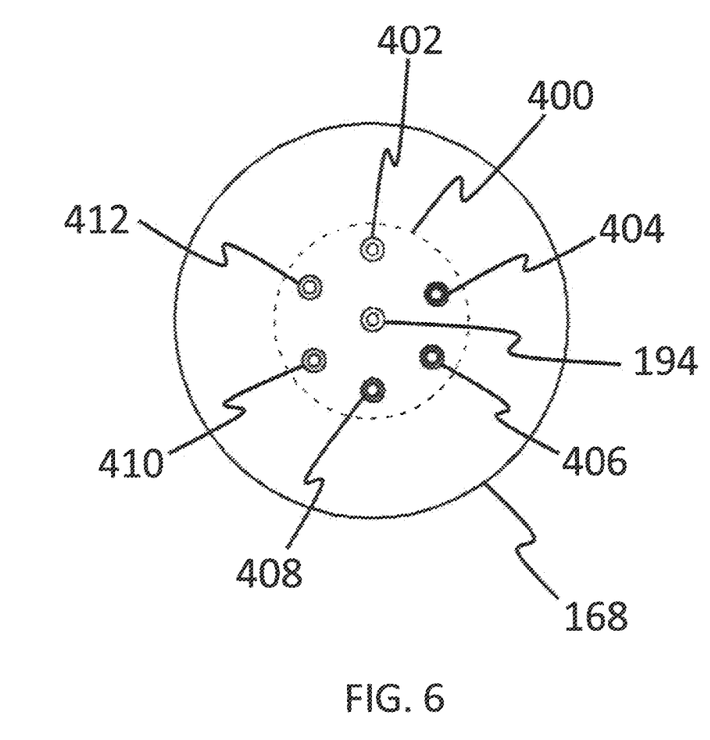
FIG. 6 shows a view of a portion of another embodiment of the system of these teachings.

Multiple fibers may be spliced using single SPLICE or connector embodiments by making multiple alignment channels or divots as shown in FIG. 6. Referring to FIG. 6, the central divot 194 can be accompanied by an additional one or more alignment divots, such as alignment divots 402, 404, 406, 408, 410, and 412. These additional alignment divots can be arranged with any geometry and may be confined to a region 400 representing a field of the imager that has acceptably high performance for the imaging of these divots (and the optical fiber ends that will be located in them) to the corresponding set of divots on the other end of the splice or connection. For the case of multiple fiber splices, an alignment ridge or Key or index is used to align the mating lenses rotationally.

Color coding can be used in embodiments to match fibers in proper channels for splice repairs in the field. An alignment key (not shown) or similar mechanism can be used to maintain orientation of the two rod lenses or imagers.

In many embodiments the imager is telecentric which is useful for maintaining a large coupling efficiency.

Figure 7:
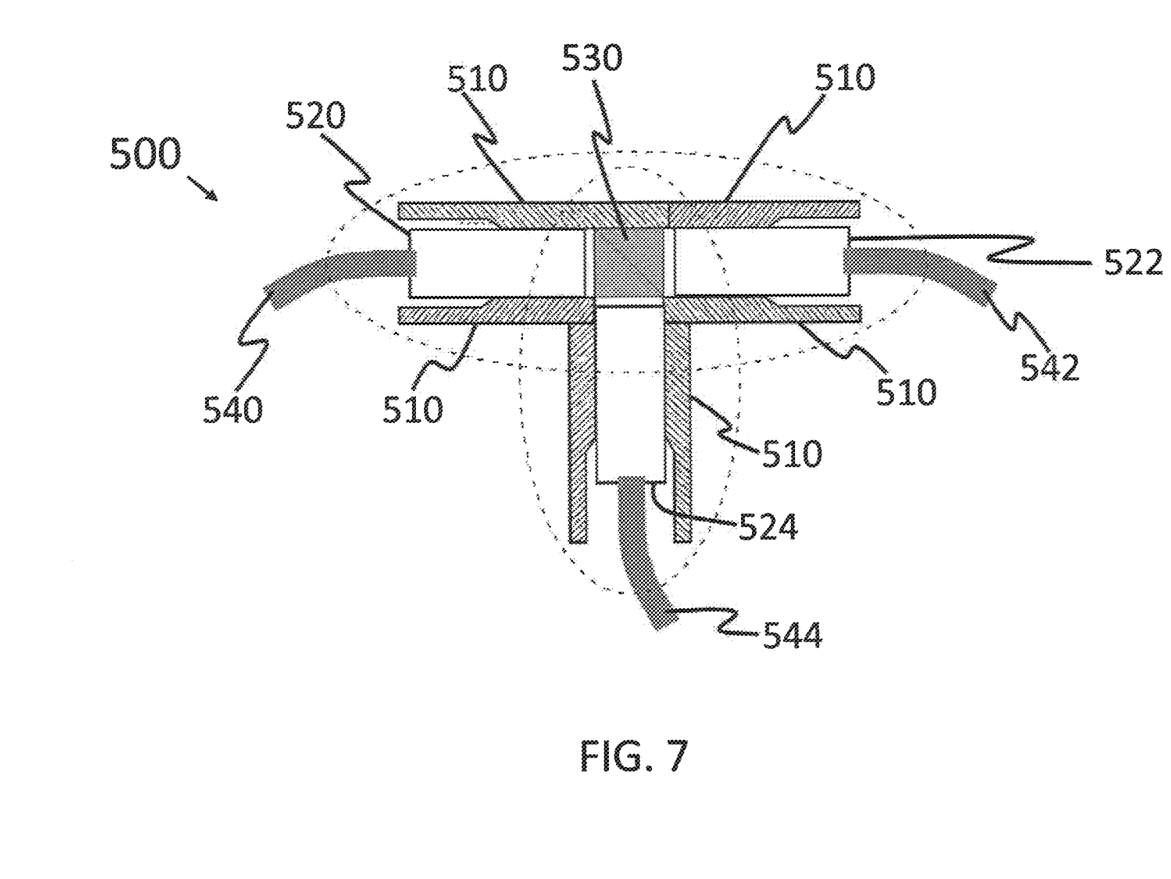
FIG. 7 shows yet another embodiment of the system of these teachings.

Other embodiments are readily extended to fiber taps as well as splices, as illustrated in configuration 500 of FIG. 7. Light from the left fiber 540 can be output to the right fiber 542 and lower 544 using the beamsplitter 530 as shown. In configuration 500 fiber 540 is cemented in the divot of divoted imager 520, fiber 542 is cemented in the divot of divoted imager 522 and fiber 544 is cemented in the divot of divoted imager 524. The imagers are aligned by housing 510. Beam splitter 530 partially reflects light from left fiber 540 to lower fiber 544 and simultaneously partially transmits light from left fiber 540 to right fiber 542. In such a fashion optical fiber 540 is simultaneously imaged onto right fiber 542 and lower fiber 544. Thus embodiment 500 can be used, for example, to splice fiber 540 onto fiber 542 and also tap the signal from optical fiber 540 onto optical fiber 544. Since the imaging is bidirectional, the embodiment 500 can also be used to combine the signals from optical fiber 542 and from optical fiber 544 into optical fiber 540.

Figure 8:
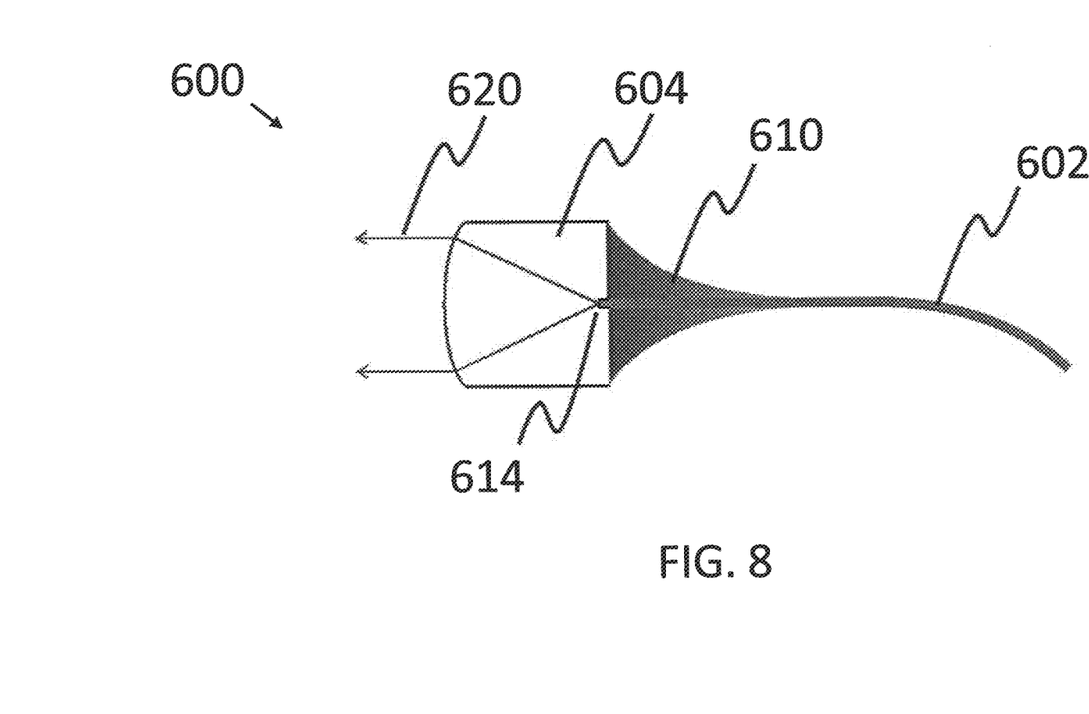
FIG. 8 shows an embodiment of an Optical Fiber and Connector of these teachings.

Another embodiment is shown in FIG. 8. Here an ultra-high-temperature connector component 600 is shown using the alignment divot to locate the fiber precisely relative to the imager. In this embodiment a high temperature fiber 602 such as a silica/doped silica fiber is aligned to the silica imager 604 using the alignment divot 614. The lens and fiber can be joined using a solder glass or other high temperature adhesive or sealant 610, etc. Light emanating from fiber 602 is shown exiting the imager in the form of a collimated beam 620. The glass solder can be extended (for example with an asymptotic taper) down the fiber for a distance, reducing or eliminating the discontinuities that typically cause fiber breakage. It is analogous to a pulled glass tube that transforms from a rigid glass tube to a fine flexible filament without any stress points as it is pulled into a fiber where it can be repeatedly bent without breakage.

The Alignment seat or divot 614 is a special feature that will position the fiber on axis and since it is in the back focal plane of the lens, the structure is insensitive to errors in angular pointing of the fiber since light from the fiber will still exit the infinite conjugate imager 604 substantially collimated and parallel to collimated beam 620 as the fiber 610 is wiggled in divot 614 prior to cementing. The lens can be inserted in a sleeve of any high temperature material and couple to a source, detector, or another fiber as described in earlier referenced configurations and embodiments.

As used herein, the singular forms "a," "an," and "the" include the plural reference unless the context clearly dictates otherwise. Except where otherwise indicated, all numbers expressing quantities of ingredients, reaction conditions, and so forth used in the specification and claims are to be understood as being modified in all instances by the term "about."

For the purpose of better describing and defining the present teachings, it is noted that terms of degree (e.g., "substantially," "about," and the like) may be used in the specification and/or in the claims. Such terms of degree are utilized herein to represent the inherent degree of uncertainty that may be attributed to any quantitative comparison, value, measurement, and/or other representation. The terms of degree may also be utilized herein to represent the degree by which a quantitative representation may vary (e.g., ±10%) from a stated reference without resulting in a change in the basic function of the subject matter at issue.

Although embodiments of the present teachings have been described in detail, it is to be understood that such embodiments are described for exemplary and illustrative purposes only. Various changes and/or modifications may be made by those skilled in the relevant art without departing from the spirit and scope of the present disclosure as defined in the appended claims.

What is claimed is:

1. A single pre-aligned fiber optic splice component comprising:
    a first structure comprising a first array of indentations; each indentation in said first array of indentations adapted to receive one or more first optical fibers;
    a single finite conjugate optical imaging subsystem, not located in said first array of indentations, optically disposed in optical communication with said first structure;
    a second structure comprising a second array of indentations; each indentation in said second array of indentations adapted to receive one or more second optical fibers; said second structure optically disposed in optical communication with said single finite conjugate optical imaging subsystem
    said single finite conjugate optical imaging subsystem being optically configured to image at least one indentation in said first array of indentations onto at least one indentation in said second array of indentations and vice versa.

2. The single pre-aligned fiber optic splice component of claim 1 wherein said first structure is comprised in the single finite conjugate optical imaging subsystem.

3. The single pre-aligned fiber optic splice component of claim 2 wherein said second structure is comprised in the single finite conjugate optical imaging subsystem.

4. An optical connector comprising:
    a first structure comprising a first array of indentations; each indentation in said first array of indentations adapted to receive one or more first optical fibers;
    a first optical imaging subsystem optically disposed in optical communication with said first structure and not located in said first array of indentations; said first optical imaging system not containing a central obscuration;
    a second optical imaging subsystem optically disposed in optical communication with said first optical imaging subsystem;
    a second structure comprising a second array of indentations; each indentation in said second array of indentations adapted to receive one or more second optical fibers; said second structure optically disposed in optical communication with said second optical imaging subsystem;
    said first and second optical imaging subsystems being optically configured to image at least one indentation in said first array of indentations onto at least one indentation in said second array of indentations and vice versa.

5. The optical connection component of claim 4 further comprising a housing; said first structure, said first optical imaging subsystem, said second optical imaging subsystem and said second structure being disposed inside said housing; said housing being configured to provide alignment of said first structure, said first optical imaging subsystem, said second optical imaging subsystem and said second structure.

6. The optical connection component of claim 4 further comprising:
- an optical beam splitter optically disposed between said first optical imaging subsystem and said second optical imaging subsystem;
- a third optical imaging subsystem in optical communication with said optical beam splitter; and
- a third structure comprising a third array of indentations, said third array of indentations comprising at least one indentation; each indentation in said third array of indentations adapted to receive one or more third optical fibers; said third structure being in optical communication with said third optical imaging subsystem.

7. The optical connection component of claim 6 further comprising a housing; said first optical element, said first optical imaging subsystem, said second optical imaging subsystem, said second structure, said third optical imaging subsystem, said optical beam splitter and said third structure being disposed inside said housing; said housing being configured to provide alignment of said first optical element, said first optical imaging subsystem, said second optical imaging subsystem, said second structure, said third optical imaging subsystem, said optical beam splitter and said third structure.

8. The optical connection component of claim 6 wherein said third structure is comprised in the third optical imaging subsystem.

9. The optical connection component of claim 6 wherein said first structure is comprised in the first optical imaging subsystem.

10. The optical connection component of claim 9 wherein said second structure is comprised in the second optical imaging subsystem.

11. An optical fiber connection comprising:
- the single pre-aligned fiber optic splice component of claim 1;
- one or more first optical fibers operatively attached into one or more indentations from said first array of indentations; and one or more second optical fibers operatively attached into one or more indentations from said second array of indentations.

12. The optical fiber connection of claim 11 wherein said first structure is comprised in the single finite conjugate optical imaging subsystem.

13. The optical fiber connection of claim 12 wherein said second structure is comprised in the single finite conjugate optical imaging subsystem.

14. An optical fiber connection comprising:
- the optical connection component of claim 6;
- one or more first optical fibers operatively attached into one or more first optical fibers operatively attached into one or more indentations from said first array of indentations; and one or more second optical fibers operatively attached into one or more indentations from said second array of indentations; and
- one or more third optical fibers operatively attached into one or more indentations from said third array of indentations.

15. The optical fiber connection of claim 14 wherein said third structure is comprised in the third optical imaging subsystem.

16. The optical fiber connection of claim 14 wherein said first structure is comprised in the first optical imaging subsystem.

17. The optical fiber connection of claim 16 wherein said second structure is comprised in the second optical imaging subsystem.

18. The optical connection component of claim 4 wherein said first structure is prealigned and operatively affixed to said first optical imaging subsystem.

19. The optical connection component of claim 18 wherein said second structure is prealigned and operatively affixed to said second optical imaging subsystem.

20. A single pre-aligned fiber optic splice component comprising:
- a first structure comprising a first array of indentations; said first array of indentations comprising at least two indentations; each indentation in said first array of indentations adapted to receive one or more first optical fibers;
- a single finite conjugate optical imaging subsystem optically disposed in optical communication with said first structure;
- a second structure comprising a second array of indentations; each indentation in said second array of indentations adapted to receive one or more second optical fibers; said second structure optically disposed in optical communication with said single finite conjugate optical imaging subsystem;
- said single finite conjugate optical imaging subsystem being optically configured to image at least two indentations in said first array of indentations onto at least two indentations in said second array of indentations and vice versa.

21. An optical connector comprising:
- a first structure comprising a first array of at least two indentations; each indentation in said first array of indentations adapted to receive one or more first optical fibers;
- a first optical imaging subsystem optically disposed in optical communication with said first structure; said first optical imaging system imaging at least two indentations in said first array of indentations, and not containing a central obscuration;
- a second optical imaging subsystem optically disposed in optical communication with said first optical imaging subsystem;
- a second structure comprising a second array of at least two indentations; each indentation in said second array of indentations adapted to receive one or more second optical fibers; said second structure optically disposed in optical communication with said second optical imaging subsystem;
- said first and second optical imaging subsystems being optically configured to image at least two indentations in said first array of indentations onto at least two indentations in said second array of indentations and vice versa.

* * * * *